US011480282B2

(12) United States Patent
Bolat

(10) Patent No.: US 11,480,282 B2
(45) Date of Patent: Oct. 25, 2022

(54) COUPLING DEVICE

(71) Applicant: EISELE GmbH, Waiblingen (DE)

(72) Inventor: Hakan Bolat, Hamburg (DE)

(73) Assignee: EISELE GmbH, Waiblingen (DE)

( * ) Notice: Subject to any disclaimer, the term of this patent is extended or adjusted under 35 U.S.C. 154(b) by 678 days.

(21) Appl. No.: 16/314,909

(22) PCT Filed: Jun. 22, 2017

(86) PCT No.: PCT/EP2017/000727
§ 371 (c)(1),
(2) Date: Jan. 3, 2019

(87) PCT Pub. No.: WO2018/010828
PCT Pub. Date: Jan. 18, 2018

(65) Prior Publication Data
US 2019/0203866 A1 Jul. 4, 2019

(30) Foreign Application Priority Data
Jul. 9, 2016 (DE) ..................... 10 2016 008 398.0

(51) Int. Cl.
*F16L 39/04* (2006.01)
*F16L 39/00* (2006.01)
*F16L 27/08* (2006.01)

(52) U.S. Cl.
CPC .............. *F16L 39/04* (2013.01); *F16L 27/08* (2013.01); *F16L 39/00* (2013.01)

(58) Field of Classification Search
CPC ........ F16L 39/04; F16L 39/06; F16L 27/0828
See application file for complete search history.

(56) References Cited

U.S. PATENT DOCUMENTS

| 2,462,006 A | * | 2/1949 | Schmitter | F16L 39/04 285/121.4 |
| 2,693,373 A | * | 11/1954 | Tremolada | F16L 39/04 285/121.4 |
| 2,877,026 A | * | 3/1959 | Payne | F16L 39/04 277/365 |
| 3,166,344 A | * | 1/1965 | Davis | E02F 9/123 285/121.3 |
| 4,377,253 A | | 3/1983 | Bruneel | |

(Continued)

FOREIGN PATENT DOCUMENTS

| DE | 21 21 049 | 11/1972 | |
| DE | 9411419 U1 | * 11/1994 | .......... F16L 27/0828 |

(Continued)

OTHER PUBLICATIONS

International Search Report (ISR) dated Sep. 21, 2017 in International (PCT) Application No. PCT/EP2017/000727.

*Primary Examiner* — Matthew Troutman
*Assistant Examiner* — Fannie C Kee
(74) *Attorney, Agent, or Firm* — Collard & Roe, P.C.

(57) ABSTRACT

A coupling device has two releasably interconnected coupling parts which are movably arranged relative to one another in at least one direction of rotation. Each coupling part has fluid channels which are separated in groups from each other and open into respectively assignable connecting spaces. The connecting spaces are located at adjacent end sides of the coupling parts and are separated from one another within a coupling part.

13 Claims, 9 Drawing Sheets

(56) References Cited

U.S. PATENT DOCUMENTS

| | | | | |
|---|---|---|---|---|
| 5,052,436 A * | 10/1991 | Bauch | ............... | F16L 27/0828 |
| | | | | 137/580 |
| 5,799,692 A * | 9/1998 | Gobell | ............... | B23Q 1/0027 |
| | | | | 137/580 |
| 6,053,787 A * | 4/2000 | Erstad | ............... | B63B 22/026 |
| | | | | 441/5 |
| 6,401,746 B1 * | 6/2002 | Scott, Jr. | ............... | F16L 39/04 |
| | | | | 137/240 |
| 7,074,275 B2 * | 7/2006 | Arnold | ............... | F16L 39/04 |
| | | | | 118/318 |
| 2008/0113537 A1 | 5/2008 | Imai et al. | | |
| 2011/0225988 A1 | 9/2011 | Baust et al. | | |
| 2015/0338008 A1 | 11/2015 | Baust et al. | | |

FOREIGN PATENT DOCUMENTS

| | | | | |
|---|---|---|---|---|
| DE | 20 2009 005 674 | | 7/2009 | |
| EP | 1477720 A1 * | 11/2004 | ............ | F16L 39/04 |
| EP | 1 832 795 | | 9/2007 | |
| FR | 1 011 346 | | 6/1952 | |
| FR | 2 089 610 | | 1/1972 | |
| GB | 2 068 785 | | 8/1981 | |

\* cited by examiner

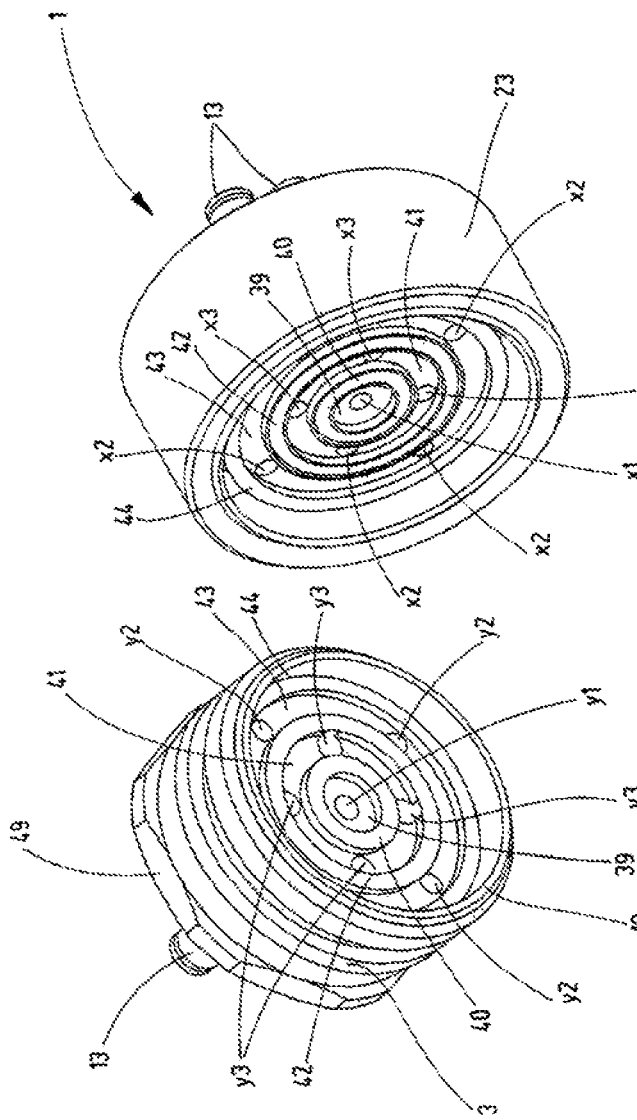

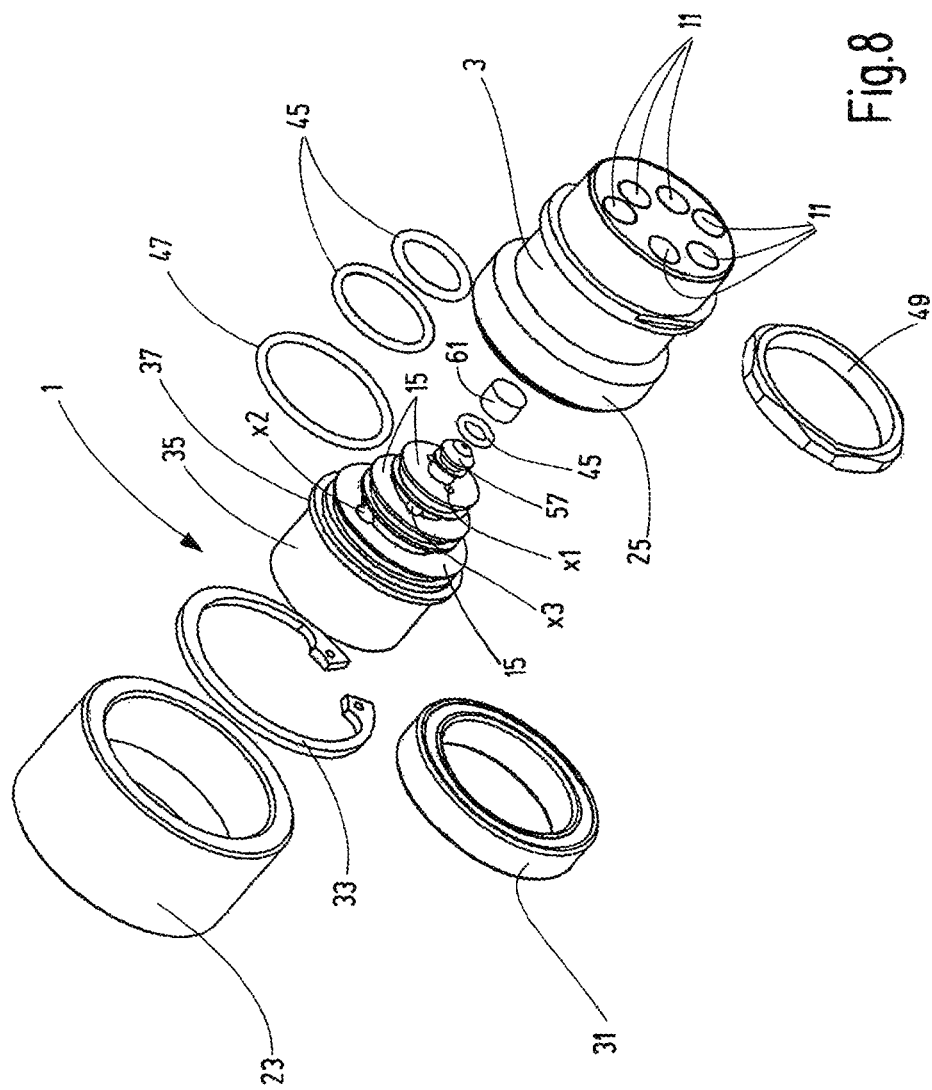

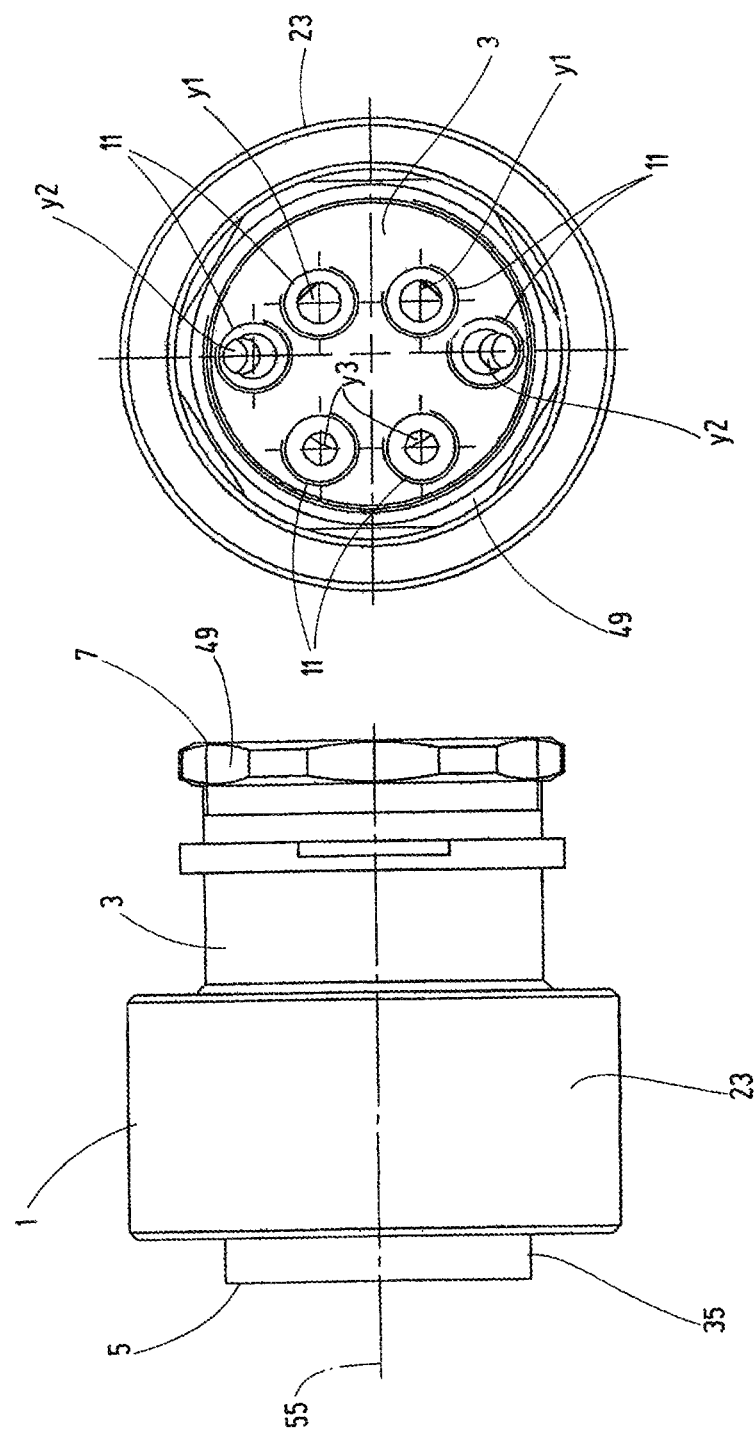

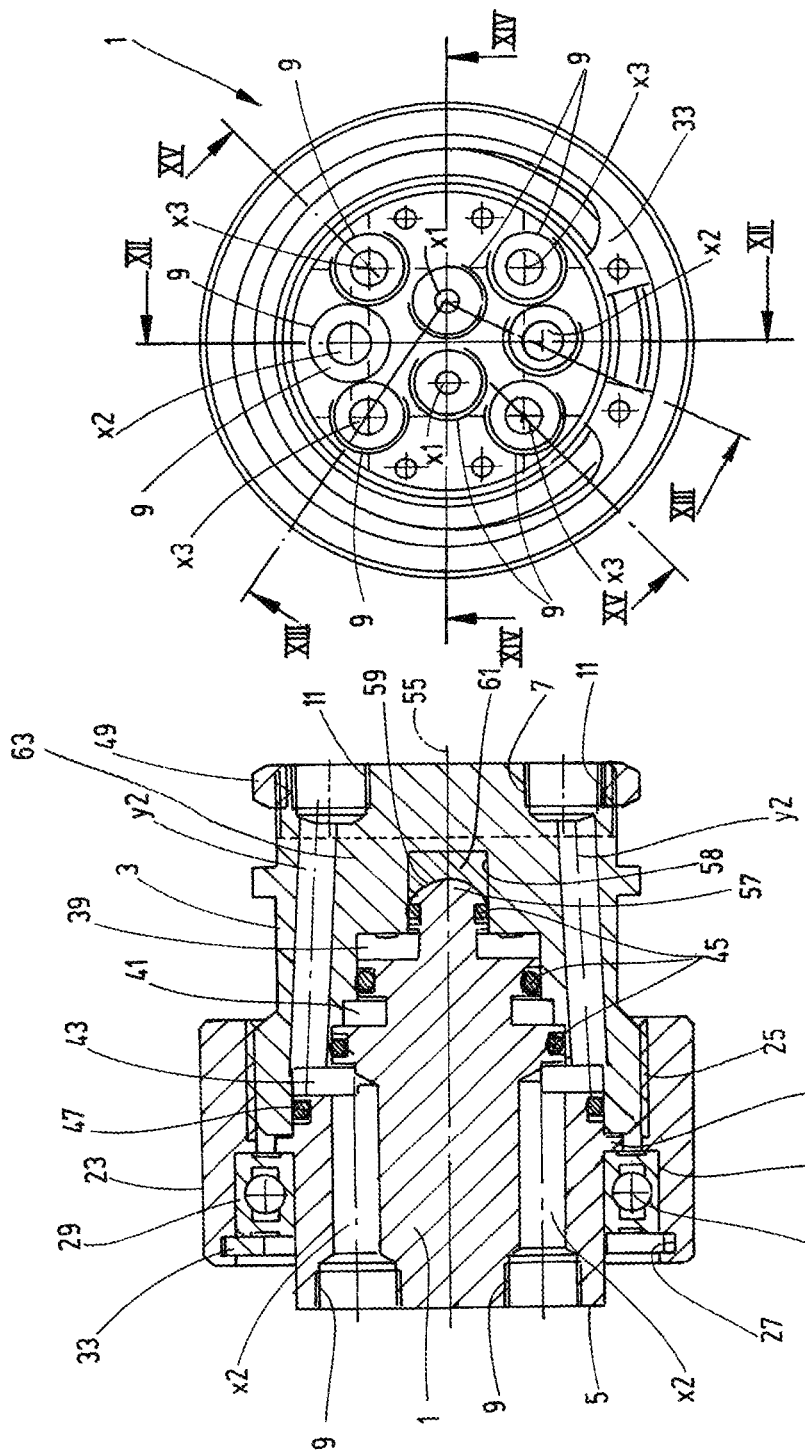

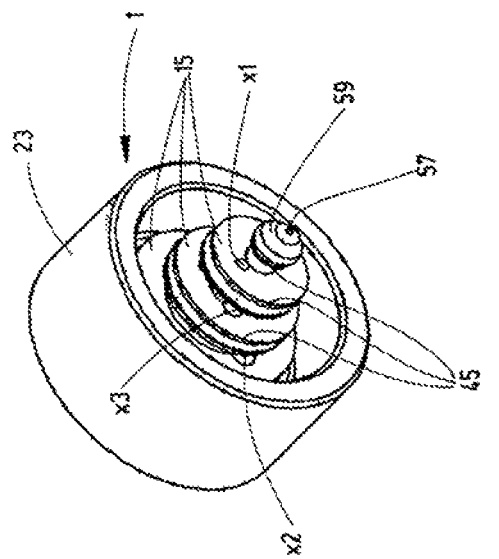

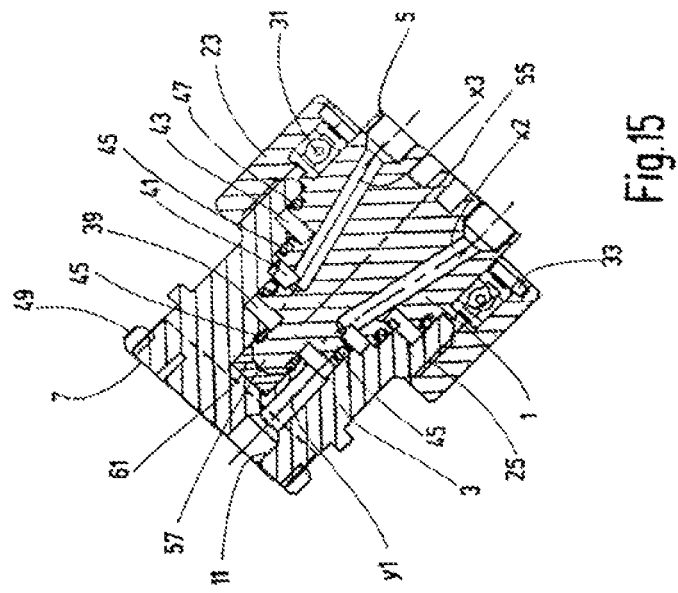
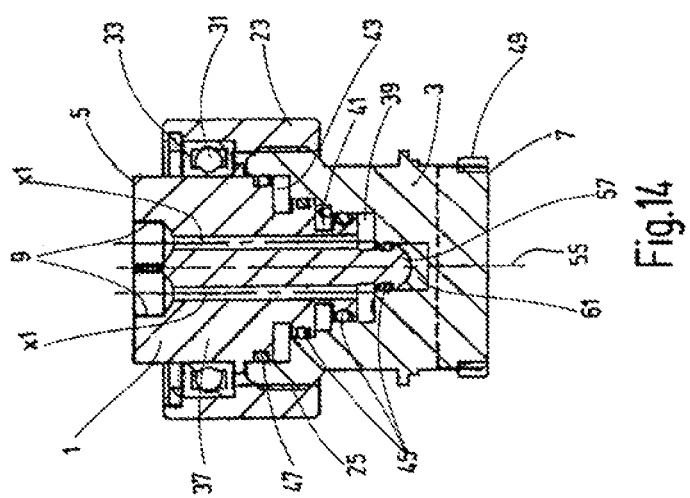

COUPLING DEVICE

CROSS REFERENCE TO RELATED APPLICATIONS

This application is the National Stage of PCT/EP2017/000727 filed on Jun. 22, 2017, which claims priority under 35 U.S.C. § 119 of German Application No. 10 2016 008 398.0 filed on Jul. 9, 2016, the disclosures of which are incorporated by reference. The international application under PCT article 21(2) was not published in English.

BACKGROUND OF THE INVENTION

1. Field of the Invention

The invention relates to a coupling device, having two detachably interconnected coupling parts, which are arranged in at least one direction of rotation relatively movable to each other.

2. Description of the Related Art

Coupling devices of this type are used, for example, for connecting two hose lines or for connecting a hose line to a permanent line connection. The rotatability of the coupling parts is to reduce or prevent bending or torsional stress of the line sections possibly occurring during the rotation of the one line section. Different media, for instance liquids or gases, such as compressed air in pneumatic applications, can be routed through the line sections.

Coupling devices of this type are state of the art. For instance, document DE 20 2009 005 674 U1 shows a device of this type for the pivotable connection of two line sections. In this solution, a coupling part is formed in the manner of an angle section, on which the other coupling part is rotatably arranged such that the fluid passage of a coupling part is at right angles to the fluid passage in the other coupling part. This device is provided for connecting a hose and a pipe using a quick connector.

SUMMARY OF THE INVENTION

Based on this prior art, the invention addresses the problem of providing a coupling device of the type mentioned, enabling groups of line sections to be connected to one another, which are connected to the ports of the relevant fluid channels of the coupling parts, which are rotatable relative to each other.

This problem is solved by a coupling device having the features according to the invention.

According to the invention, a significant feature is that each coupling part has several fluid channels, which open separated from each other by groups into allocable connection chambers, which are located on the adjacent end faces of the coupling parts and are separated from each other within a coupling part. In this way, a multi-rotary connector is provided, which can perform the function of a plurality of rotary connectors according to the prior art as one structural unit. Due to the groupwise separation of the fluid channels, groups of lines conveying different media can be rotatably connected to each other.

In advantageous embodiments, at at least one coupling part, preferably at both coupling parts, the connecting chambers, into which the relevant fluid channels open, can be provided frontally at the allocable coupling part in a concentric ring channel arrangement in a common plane lying or in an axially and radially stepped arrangement. For coplanar connecting chambers, the coupling body consisting of two coupling parts can be formed particularly short in the longitudinal direction. The stepped arrangement of the connection chambers allows for a particularly slim design of the device.

The relevant group of fluid channels can consist of one or two or more channels, wherein the same number of channels for a group can be used at each coupling part, which channels open at predetermined locations into the relevant allocable connection chamber, which is arranged congruent with the opposite connection chamber of the other coupling part such that an aligned fluid connection of the channels belonging to one group can be established with the other channels of this group of the one coupling part. Alternatively, a different number of fluid channels may be provided for a relevant group in the coupling parts, such that the channels of one coupling part continue in the other coupling part in a different number of channels. In this way, the coupling device can perform the function of a rotary distributor In the coupling parts, the fluid channels may be formed of parallel or oblique drilled holes having the same or different diameters as the relevant coupling part and can have a port for attaching a fluid line, such as a pneumatic line, at their ends facing away from the relevant connection chamber With particular advantage, for the rotatable arrangement of the one coupling part relative to the other coupling part, a pivot bearing, in particular in the form of a rolling bearing, such as a ball bearing, can be arranged between the one coupling part and an attachment part, which can be used to attach the other coupling part in the coupling position relative to the other coupling part for making the coupling connection. As an attachment part, a union nut can be provided to form a screw connection between the coupling parts.

Advantageously, the arrangement can be made such that the individual connection chambers in the relevant coupling part are sealed against the environment and against each other in the axial and/or radial direction by means of a sealing system having a plurality of sealing rings. Preferably, sealing rings in the form of O-rings are provided for this purpose.

In a stepped arrangement of the connecting chambers, the latter can be at least partially formed by an axial interstice between the end faces of the two coupling parts facing each other, wherein at the same axial length of the interstice, the volume of each outer connection chamber in the stepped arrangement is greater than the volume of the connection chamber one step down (inwards).

Furthermore, in the case of a stepped arrangement of the connecting chambers, the arrangement may advantageously be made such that the area along the longitudinal axes of the two coupling parts is kept free of channels and a guide pin of one coupling part engages in sealing manner with a guide receptacle of the other coupling part, wherein a spacer and/or a thrust bearing of predeterminable axial length is inserted preferably between the guide pin and guide receptacle. As a result, the coupling parts attached in the coupling position by means of the attachment part are guided particularly securely during the relative rotational movement, especially when both a second pivot bearing and a precise axial positioning of the coupling parts are formed by a thrust bearing.

In exemplary embodiments in which a different number of guide channels of the same design is present in the coupling parts, a fluid restriction can be achieved if the number of channels decreases for a relevant group at the port.

BRIEF DESCRIPTION OF THE DRAWINGS

Below the invention is explained in detail with reference to exemplary embodiments shown in the drawing. In the Figures:

FIGS. 2 and 3 show perspective oblique views of the male or female coupling part of the exemplary embodiment;

FIG. 8 shows a perspective view of a second exemplary embodiment of the coupling device according to the invention drawn in the manner of an exploded view;

FIG. 9 shows a side view of the second exemplary embodiment of the coupling device;

FIG. 10 shows a front view of the female coupling part of the second exemplary embodiment;

FIG. 11 shows a front view of the male coupling part of the second exemplary embodiment;

FIG. 12 shows a longitudinal section of the second exemplary embodiment along the section line XII-XII of FIG. 11;

FIG. 13 shows an angle section of the second exemplary embodiment along the section line XIII-XIII of FIG. 11;

FIG. 14 shows a longitudinal section of the second exemplary embodiment along the section line XIV-XIV of FIG. 11;

FIG. 15 shows a longitudinal section of the second exemplary embodiment along the section line XV-XV of FIG. 11; and FIG. 16 shows a perspective oblique view of the separately shown male coupling part of the second exemplary embodiment.

DETAILED DESCRIPTION OF THE PREFERRED EMBODIMENTS

Figure 1:
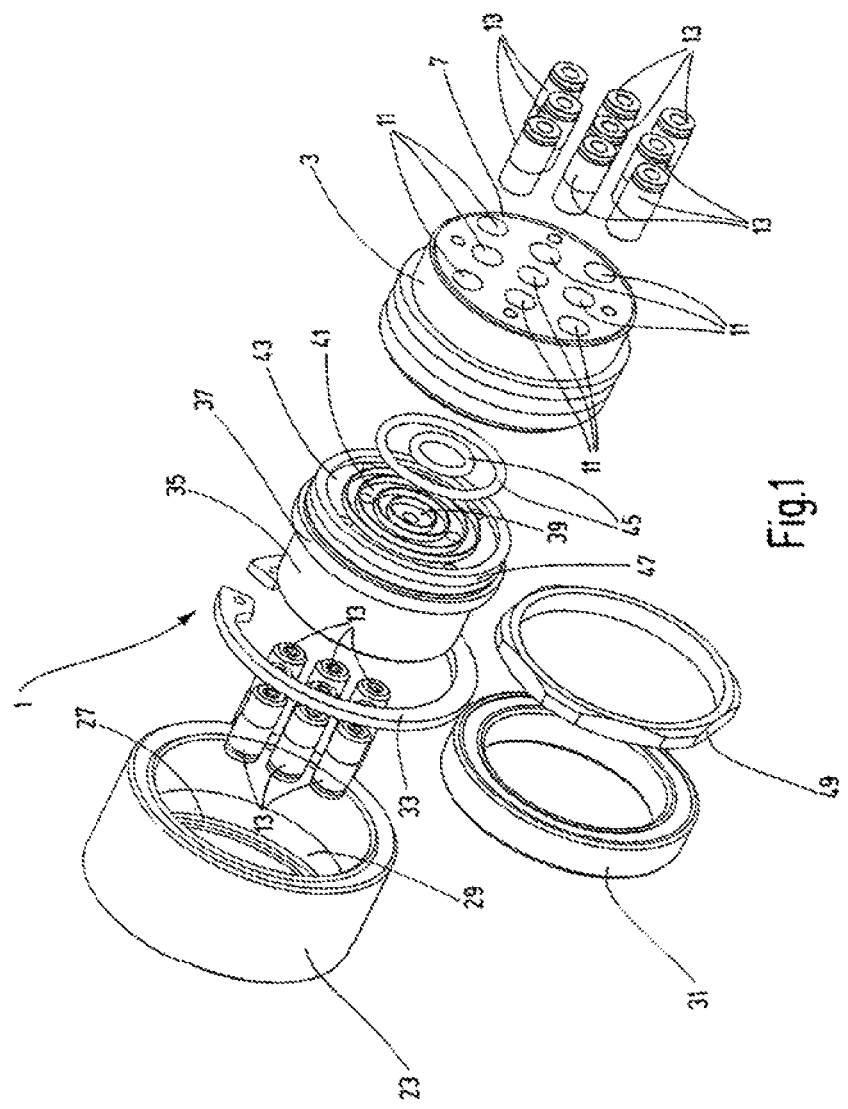
FIG. 1 shows a perspective view of an exemplary embodiment of the coupling device according to the invention drawn in the manner of an exploded view.
Figure 4:
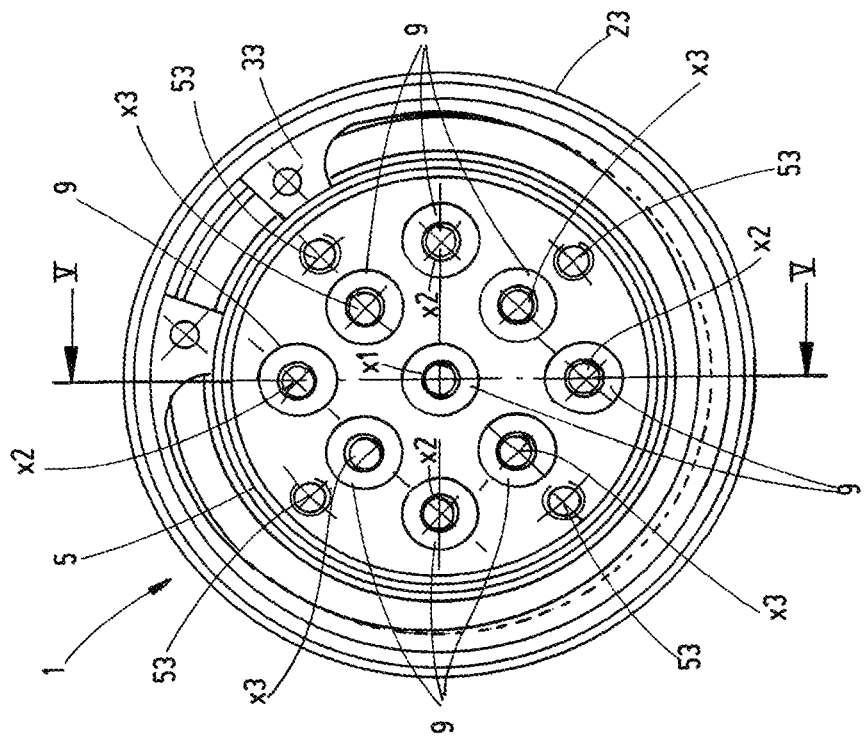
FIG. 4 shows an end view of the male coupling part.
Figure 5:
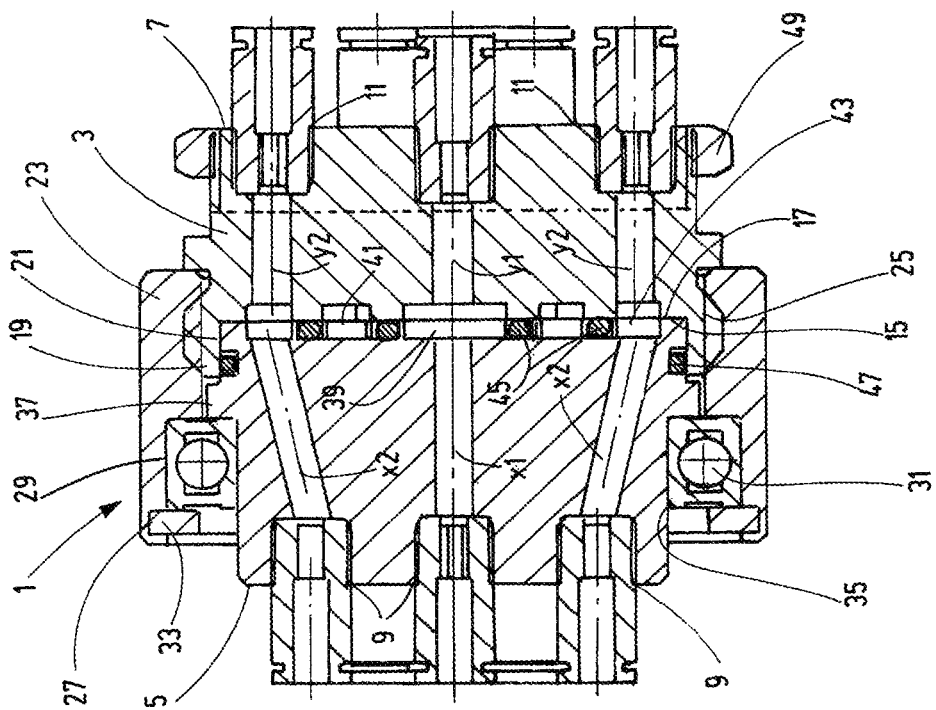
FIG. 5 shows a longitudinal section of the exemplary embodiment along section line V-V of FIG. 4.
Figure 7:
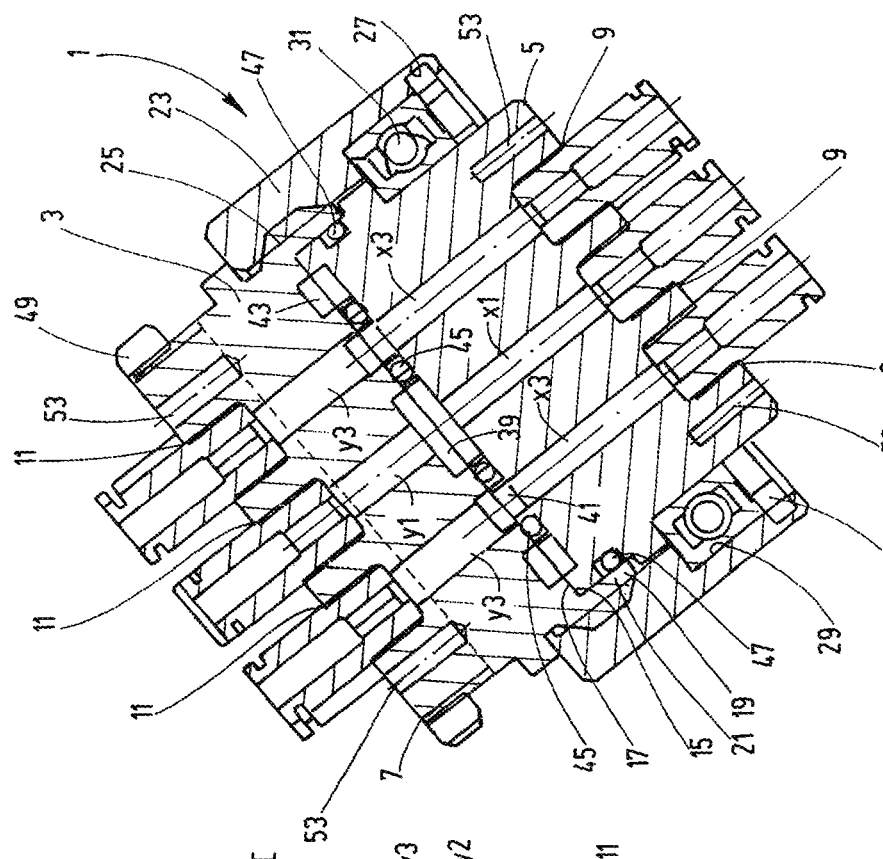
FIG. 7 shows a longitudinal section of the exemplary embodiment along section line VII-VII of FIG. 6.

FIGS. 1 to 7 show a first exemplary embodiment of the coupling device according to the invention. It has a first, male coupling part 1, which is shown separately in FIG. 2, and a second, female coupling part 3, which is shown separately in FIG. 3. Both coupling parts 1, 3 have the shape of metallic round bodies, wherein the female coupling part 3 is integrally formed, while the male coupling part 1, as can be seen most clearly in FIG. 1, is designed in several parts. At the outer ends 5 and 7, which are on the outside in the assembled coupling position of the coupling parts 1, 3, as shown in FIGS. 5 and 7, both coupling parts 1, 3 have ports for fluid lines (not shown). At the male coupling part 1, the ports were given the numeral 9 and at the female coupling part 3 the numeral 11. The line connectors located in the ports 9 and 11 were given the numeral 13 only in FIGS. 1 to 3.

In the coupling position shown in FIGS. 5 and 7, the end faces 15 and 17 of the coupling parts 1 and 3 extending in a radial plane abut each other, wherein a peripheral rim 19 of the female coupling part 3 axially projecting beyond the end face 17 extends across the end area 21 of the male coupling part 1, tapering in diameter. To attach the coupling parts 1, 3 in this abutment, which permits a rotation relative to each other, the male coupling part 1 has an attachment part in the form of a union nut 23, which can be screwed to a male thread 25 of the female coupling part 3. In the end area opposite the threaded section, the union nut 23 has an inner annular groove 27, which is inwardly followed by a bearing seat 29 for a ball bearing 31. This ball bearing is axially immovably attached in the bearing seat 29 by a retaining ring in the form of an inner locking ring 33 mounted in the annular groove 27, which locking ring bears against the outer ring of the ball bearing 31. As the inner ring of the ball bearing 31 seated on a cylindrical end section 35 at the coupling part 1 rests on a radially projecting annular collar 37, the coupling parts 1, 3 can be secured in the coupling position by means of the union nut 23.

For groups of pipe sections (not shown) to be connected to the coupling parts 1 and 3, fluid channels are formed in the coupling parts 1 and 3 by drilled holes, which fluid channels run inside the coupling parts 1 and 3 from the ports 9 and 11 to the end faces designated by 15 and 17 in FIGS. 5 and 7. In the male coupling part 1, the fluid channels are each designated by an x preceding the group numbers one to three and in the female coupling part 3 by a y preceding the group number. At the coupling parts 1, 3 for each of the three groups of fluid channels provided in this example, a connecting chamber is formed, of which the connection chamber provided for the group x1, y1 is numbered 39, the one provided for the group x2, y2 is numbered 41 and the one provided for group x3, y3 is numbered 43. The connecting chambers 39, 41, 43 are formed by depressions in the end faces 15, 17. As can be seen most clearly from FIGS. 2 and 3, the recess for the radially innermost, coaxial connection chamber 39 is formed by a circular cylinder, whereas the recesses for the radially outer connection chambers 41 and 43 are formed by concentric annular grooves, between which the non-recessed areas of the end faces 15, 17 form concentric annular ribs 40, 42 and 44, cf. FIGS. 2 and 3. At the end faces 15, 17, the connecting chambers 39, 41, 43 are sealed against each other by O-rings 45. A further O-ring 47 is provided for sealing against the environment, which O-ring forms a seal between the end area 21 of the male coupling part 1 and the protruding peripheral rim 19 of the female coupling part 3.

Figure 6:
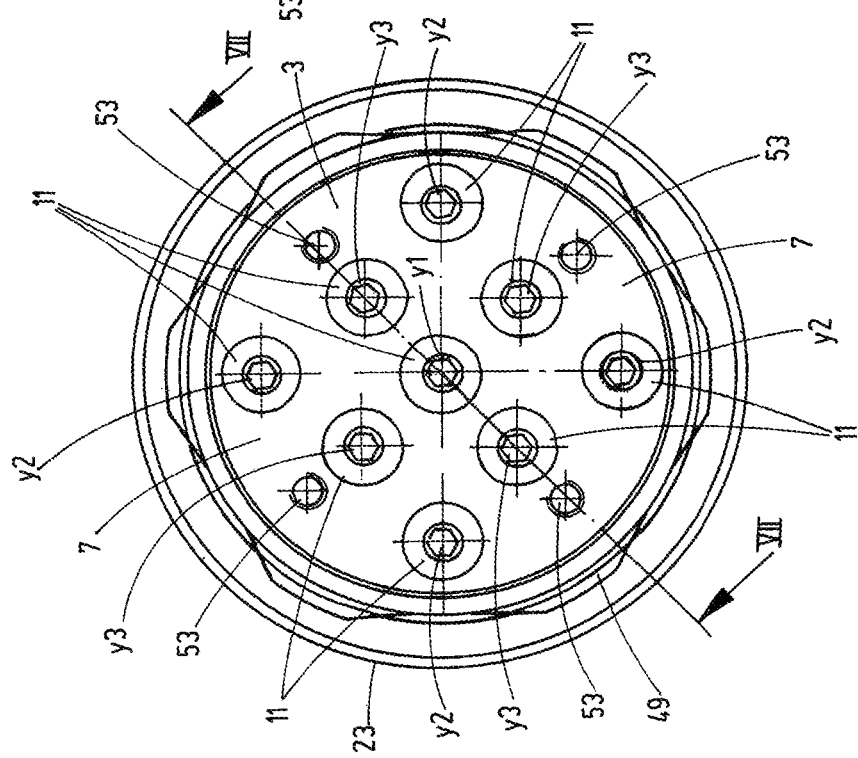
FIG. 6 shows an end view of the female coupling part of the exemplary embodiment along the section line VII-VII.

In the exemplary embodiment of FIGS. 1 to 7, the same number of fluid channels, in the example shown, nine fluid channels, is provided in each case for every group in the coupling parts 1 and 3. As shown in FIGS. 5 and 7, the channels x1, y1 are arranged coaxially in both coupling parts 1 and 3. In the male coupling part 1, the channels x3 also run parallel to the axis, whereas the channels x2, starting from the ports 9, are divergent with respect to one another, because, as the comparison of FIGS. 4 and 6 shows, the ports 11 for the fluid channels y2 are located at a larger radius than the port 9 in the first coupling part for the channels x2 of the same group. In the female coupling part 3, the fluid channels y1, y2 and y3 run axially parallel for all groups 1 to 3, as shown in FIGS. 5 and 7.

If a different number of channels is provided in the coupling parts 1, 3, the device can form a line rotary distributor, or a fluid restriction can be achieved, based on the same design of the channels, due to a reduced number of channels in one of the coupling parts 1, 3. The latter can also be achieved by different channel cross sections in the coupling parts 1, 3.

In the example shown, a lock nut 49 for attaching the female coupling part 3 to a structure is provided on a threaded section of the coupling part 3. One or the other coupling part 1, 3 can also be attached by means of threaded bores 53 formed at the end and retaining screws (not shown).

FIGS. 8 to 16 show a second exemplary embodiment in which the number of fluid channels in the coupling parts 1, 3 is different, wherein the male coupling part 1 contains eight fluid channels and the female coupling part 3 six fluid channels. As a further difference from the first exemplary embodiment, the wall parts forming the end faces 15 and 17 of the coupling parts 1 and 3 facing each other, are not stepped in a radial plane, but, as can be seen most clearly from FIGS. 12 and 13, in the axial direction and radial direction, wherein the first coupling part 1 has no channel in the central area surrounding the longitudinal axis 55 and ends in a guide pin 57 forming the step having the smallest diameter. In the coupling position, this pin extends into a guide receptacle 58 in the coupling part 3 and forms a partially spherical bearing surface 59 to form a thrust bearing having a sliding bearing 61, which is mounted in a central bearing seat 63 in the second coupling part 3, the front side of which is also stepped in a manner complementary to that of the first coupling part 1. As can also be seen most clearly from FIG. 12, connecting chambers are formed as annular interstices between the coupling parts 1 and 3 for the line groups x1 to x3 and y1 to y3, wherein, as in the first exemplary embodiment, for the group x1, y1 the connection chamber 39, for the group x3, y3 the connection chamber 41 and for the group x2, y2 the connection chamber 43 is formed radially outward from the inside. In the design of the central part of the first coupling part 1 without channels, the guide channels x1 to x3 and y1 to y3 are guided in the way shown in FIGS. 12 to 15. At the male coupling part 1, as shown in FIG. 11, there are eight ports 9, at the female coupling part 3, as shown in FIG. 10, there are only six ports 11. More specifically, the four fluid channels x3 of the first coupling part 1 continue in only two fluid channels y2 in the other coupling part 3.

The thrust bearing formed between the bearing surface 59 of the guide pin 57 and the slide bearing 61 on the second coupling part 3 not only forms a second bearing point in addition to the ball bearing 31, which forms the only pivot bearing in the first exemplary embodiment, but also serves as a spacer for the axial positioning of the coupling parts 1, 3 in the coupling position, in which the coupling parts 1, 3 can be attached by means of the union nut 23 in a manner corresponding to the first exemplary embodiment. In a similar manner, as in the first exemplary embodiment, the connecting chambers 39, 41 and 43 are also sealed from each other and from the environment by means of O-rings 45 and 47, wherein the innermost O-ring 45 forms the seal between the guide pin 57 of the coupling part 1 and the guide receptacle 58 of the second coupling part 3. Whereas in the first exemplary embodiment of FIGS. 1 to 7, the fluid channels in both coupling parts 1, 3 have the same cross section, in this, the second exemplary embodiment, the fluid channels have different cross sections. As can be seen most clearly in FIGS. 11, 13 and 14, in the coupling part 1 the fluid channels of group x1 have the smallest diameter, the fluid channels of group x3 have a larger diameter and the fluid channels of group x2 have the largest diameter. In the second coupling part 3, the fluid channels of group y1 have the largest diameter and the fluid channels of group y3 have the smallest diameter. For different positions of the ports 9 in the coupling part 1, as shown in FIG. 11, and the ports 11 in the second coupling part 3, as shown in FIG. 10, in the first coupling part 1 two guide channels x1 run closely spaced and parallel to the axis 55, cf. FIG. 14. Two channels x2 run obliquely to the axis 55 and four channels x3 also run obliquely to the axis 55. In the second coupling part, in which three channels are omitted from channel group three, resulting in only two channels y3, they run slightly obliquely to axis 55, cf. FIG. 13, whereas the two fluid channels y1 run parallel to the axis. The pair of fluid channels y2 runs obliquely from the ports 11 to the axis 55 and slightly diverging to the connection chamber 43.

The invention claimed is:

1. A coupling device, comprising:
   a first male coupling part; and
   a second female coupling part;
   wherein the first male coupling part and the second female coupling part are detachably interconnected;
   wherein the first male coupling part and the second female coupling part are arranged movably in at least one direction of rotation relative to each other;
   wherein the first male coupling part has a first group of fluid channels, a second group of fluid channels, and a third group of fluid channels;
   wherein the first group of fluid channels, the second group of fluid channels, and the third group of fluid channels are separated from each other in a form of an axially and radially stepped arrangement;
   wherein the first group of fluid channels, the second group of fluid channels, and the third group of fluid channels are sealed against each other;
   wherein the second female coupling part has a fourth group of fluid channels, a fifth group of fluid channels, and a sixth group of fluid channels;
   wherein the fourth group of fluid channels, the fifth group of fluid channels, and the sixth group of fluid channels are separated from each other;
   wherein the first group of fluid channels and the fourth group of fluid channels open into a first connection chamber, the second group of fluid channels and the fifth group of fluid channels open into a second connection chamber, and the third group of fluid channels and the sixth group of fluid channels open into a third connection chamber;
   wherein the first connection chamber is located at a first end face of the first male coupling part and a second end face of the second female coupling part adjacent to each other which are separated from each other within one of the coupling parts;
   wherein the second connection chamber is located at a third end face of the first male coupling part and a fourth end face of the second female coupling part adjacent to each other which are separated from each other within one of the coupling parts;
   wherein the third connection chamber is located at a fifth end face of the first male coupling part and a sixth end face of the second female coupling part adjacent to each other which are separated from each other within one of the coupling parts;
   wherein for the rotatable arrangement of the first male coupling part relative to the second female coupling part, a pivot bearing is arranged between the first male coupling part and an attachment part, which can be used to attach the first male coupling part in the coupling position relative to the second female coupling part for making the coupling connection.

2. The coupling device according to claim 1, wherein each of the first group of fluid channels, the second group of fluid channels, the third group of fluid channels, the fourth group of fluid channels, the fifth group of fluid channels, and the sixth group of fluid channels comprise two or more channels.

3. The coupling device according to claim 1, wherein the fluid channels of the first group of fluid channels, the fluid channels of the second group of fluid channels, the fluid channels of the third group of fluid channels, the fluid channels of the fourth group of fluid channels, the fluid channels of the fifth group of fluid channels, and the fluid channels of the sixth group of fluid channels are formed of parallel or oblique drilled holes having the same or different diameters in the relevant coupling part and have a port for attaching a fluid line at ends of the ports facing away from the relevant connection chamber.

4. The coupling device according to claim 3, wherein the fluid line is a pneumatic line.

5. The coupling device according to claim 1, wherein the pivot bearing comprises a rolling bearing.

6. The coupling device according to claim 1, wherein the pivot bearing comprises a ball bearing.

7. The coupling device according to claim 1, wherein the individual connection chambers in the relevant coupling part are sealed against each other and against the environment in the axial and/or radial direction by means of a sealing system having several sealing rings.

8. The coupling device according to claim 1, wherein in the stepped arrangement of the connecting chambers, the connecting chambers can be at least partially formed by an axial interstice between the end faces of the first male coupling part and the second female coupling part facing each other, and wherein at the same axial length of the interstice, a volume of each outer connection chamber in the stepped arrangement is each greater than the volume of the connection chamber one step inward.

9. The coupling device according to claim 1, wherein in the stepped arrangement of the connecting chambers, an area along a longitudinal axis of the first male coupling part is kept free of the fluid channels of the first group of fluid channels, the fluid channels of the second group of fluid channels, and the fluid channels of the third group of fluid channels and a guide pin of the first male coupling part engages in a sealing manner with a guide receptacle of the female coupling part.

10. The coupling device according to claim 9, wherein between the guide pin and the guide receptacle a spacer and/or a thrust bearing of predetermined axial length is inserted.

11. The coupling device according to claim 1, wherein there are a different number of channels between the first male coupling part and the second female coupling part.

12. A coupling device, comprising:
a first male coupling part; and
a second female coupling part;
wherein the first male coupling part and the second female coupling part are detachably interconnected;
wherein the first male coupling part and the second female coupling part are arranged movably in at least one direction of rotation relative to each other;
wherein the first male coupling part has a first group of fluid channels, a second group of fluid channels, and a third group of fluid channels;
wherein the first group of fluid channels, the second group of fluid channels, and the third group of fluid channels are separated from each other in a form of an axially and radially stepped arrangement;
wherein the first group of fluid channels, the second group of fluid channels, and the third group of fluid channels are sealed against each other;
wherein the second female coupling part has a fourth group of fluid channels, a fifth group of fluid channels, and a sixth group of fluid channels;
wherein the fourth group of fluid channels, the fifth group of fluid channels, and the sixth group of fluid channels are separated from each other;
wherein the first group of fluid channels and the fourth group of fluid channels open into a first connection chamber, the second group of fluid channels and the fifth group of fluid channels open into a second connection chamber, and the third group of fluid channels and the sixth group of fluid channels open into a third connection chamber;
wherein the first connection chamber is located at a first end face of the first male coupling part and a second end face of the second female coupling part adjacent to each other which are separated from each other within one of the coupling parts; and
wherein the second connection chamber is located at a third end face of the first male coupling part and a fourth end face of the second female coupling part adjacent to each other which are separated from each other within one of the coupling parts; and
wherein the third connection chamber is located at a fifth end face of the first male coupling part and a sixth end face of the second female coupling part adjacent to each other which are separated from each other within one of the coupling parts; and
wherein in the stepped arrangement of the connecting chambers, an area along a longitudinal axis of the first male coupling part is kept free of the fluid channels of the first group of fluid channels, the fluid channels of the second group of fluid channels, and the fluid channels of the third group of fluid channels and a guide pin of the first male coupling part engages in a sealing manner with a guide receptacle of the female coupling part.

13. A coupling device, comprising:
a first male coupling part; and
a second female coupling part;
wherein the first male coupling part and the second female coupling part are detachably interconnected;
wherein the first male coupling part and the second female coupling part are arranged movably in at least one direction of rotation relative to each other;
wherein the first male coupling part has a first group of fluid channels, a second group of fluid channels, and a third group of fluid channels;
wherein the first group of fluid channels, the second group of fluid channels, and the third group of fluid channels are separated from each other in a form of an axially and radially stepped arrangement;
wherein the first group of fluid channels, the second group of fluid channels, and the third group of fluid channels are sealed against each other;
wherein the second female coupling part has a fourth group of fluid channels, a fifth group of fluid channels, and a sixth group of fluid channels;
wherein the fourth group of fluid channels, the fifth group of fluid channels, and the sixth group of fluid channels are separated from each other;
wherein the first group of fluid channels and the fourth group of fluid channels open into a first connection chamber, the second group of fluid channels and the fifth group of fluid channels open into a second connection chamber, and the third group of fluid channels and the sixth group of fluid channels open into a third connection chamber;

wherein the first connection chamber is located at a first end face of the first male coupling part and a second end face of the second female coupling part adjacent to each other which are separated from each other within one of the coupling parts;

wherein the second connection chamber is located at a third end face of the first male coupling part and a fourth end face of the second female coupling part adjacent to each other which are separated from each other within one of the coupling parts; and wherein the third connection chamber is located at a fifth end face of the first male coupling part and a sixth end face of the second female coupling part adjacent to each other which are separated from each other within one of the coupling parts; and wherein there are a different number of channels between the first male coupling part and the second female coupling part.

\* \* \* \* \*